United States Patent
Xia et al.

(10) Patent No.: US 9,438,534 B2
(45) Date of Patent: Sep. 6, 2016

(54) METHOD AND SYSTEM FOR DATA SET MIGRATION OVER A CIRCUIT SWITCHING NETWORK

(71) Applicant: Telefonaktiebolaget L M Ericsson (publ), Stockholm (SE)

(72) Inventors: Ming Xia, San Jose, CA (US); Ying Zhang, Fremont, CA (US); David Hood, Palo Alto, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 29 days.

(21) Appl. No.: 14/514,127

(22) Filed: Oct. 14, 2014

(65) Prior Publication Data

US 2016/0105378 A1 Apr. 14, 2016

(51) Int. Cl.
*H04L 12/50* (2006.01)
*H04L 12/937* (2013.01)
*H04L 12/24* (2006.01)

(52) U.S. Cl.
CPC ......... *H04L 49/254* (2013.01); *H04L 41/0896* (2013.01)

(58) Field of Classification Search
CPC .................. H04L 49/254; H04L 41/0896
See application file for complete search history.

(56) References Cited

U.S. PATENT DOCUMENTS

| | | | | |
|---|---|---|---|---|
| 8,861,525 B1* | 10/2014 | Durand | ................. | H04L 61/251 370/392 |
| 8,867,915 B1* | 10/2014 | Vahdat | ................... | H04B 10/27 398/55 |
| 9,154,589 B1* | 10/2015 | Klein | ..................... | H04L 69/329 |
| 9,201,606 B1* | 12/2015 | Taylor | ................... | G06F 3/0647 |
| 9,204,207 B2* | 12/2015 | deRuijter | ............. | H04Q 3/0083 |
| 2007/0180436 A1 | 8/2007 | Travostino et al. | | |
| 2007/0282915 A1* | 12/2007 | Vosshall | ............ | G06F 17/30575 |
| 2011/0292792 A1* | 12/2011 | Zuo | ........................ | H04L 47/20 370/230 |
| 2012/0099863 A1* | 4/2012 | Xu | ..................... | H04Q 11/0005 398/49 |
| 2012/0109705 A1* | 5/2012 | Belady | ............. | G06Q 10/06312 705/7.22 |
| 2012/0131173 A1* | 5/2012 | Ferris | .................... | G06F 9/5066 709/224 |
| 2012/0226733 A1* | 9/2012 | Kim | ...................... | G06F 9/5083 709/201 |
| 2013/0054761 A1* | 2/2013 | Kempf | .................. | H04L 47/781 709/220 |
| 2013/0204963 A1* | 8/2013 | Boss | ..................... | G06F 3/0604 709/217 |
| 2013/0223277 A1* | 8/2013 | DeCusatis | ........... | H04L 67/1097 370/254 |

(Continued)

OTHER PUBLICATIONS

"Amazon Web Services", http://aws.amazon.com/, Amazon Web Services Inc., 2014, 2 pages.

(Continued)

*Primary Examiner* — Robert Wilson
(74) *Attorney, Agent, or Firm* — NDWE LLP

(57) ABSTRACT

A method for data set migration, implemented in a network device is disclosed. The method includes receiving a request at a network device to migrate a data set, and sending a signaling packet from a first data center toward a first in a series of circuit switching devices to reach a second data center, where the signaling packet includes metadata containing transmission selection and characteristics of the data set, where the signaling packet is processed through the series, each of which configures its forwarding path based at least on the metadata of the signaling packet. The method continues with waiting for a period long enough to allow each of the series to configure its forwarding path, where that circuit switching device releases the configured forwarding path after the migration duration. The method continues with sending the data set following the transmission selection of the signaling packet after the period expires.

24 Claims, 7 Drawing Sheets

(56) References Cited

U.S. PATENT DOCUMENTS

2015/0304450 A1* 10/2015 van Bemmel ...... H04L 12/4641
  709/217
2016/0105378 A1* 4/2016 Xia ..................... H04L 41/0896
  370/381

OTHER PUBLICATIONS

"Spectral grids for WDM applications: DWDM frequency grid", ITU-T G.694.1, Telecommunication Standardization Sector of ITU, Feb. 2012, 16 pages.

"Wavelength Selective Switches for ROADM Applications", Finisar Corporation, WSS ROADM Product Guide, Sep. 2011, 4 pages.

Geisler, et al., "The First Testbed Demonstration of a Flexible Bandwidth Network with a Real-Time Adaptive Control Plane", European Conference on Optical Communications (ECOC), Paper PDP TH.13.K.2, Sep. 19 2011, 3 pages.

Xia, et al., "Split spectrum: a multi-channel approach to elastic optical networking", Optics Express, vol. 20, No. 28, Dec. 2012, 6 pages.

International Search Report and Written Opinion, Application No. PCT/IB2015/057743, dated Jan. 25, 2016, 15 pages.

Neal Charbonneau et al., "A Survey of Advance Reservation Routing and Wavelength Assignment in Wavelength-Routed WDM Networks," Oct. 1, 2012, pp. 1037-1064, IEEE Communications Surveys and Tutorials, vol. 14, No. 4, Fourth Quarter 2012, IEEE.

Abhinava Sadasivarao et al., "Bursting Data Between Data Centers: Case for Transport SDN," Aug. 21, 2013, pp. 87-90, 2013 IEEE 21st Annual Symposium on High-Performance Interconnects, IEEE.

Chin Guok et al., "Intra and Interdomain Circuit Provisioning Using the OSCARS Reservation System," Oct. 1, 2006, pp. 1-8, 3rd International Conference on Broadband Communications, Networks and Systems, Broadnets 2006, IEEE.

* cited by examiner

METHOD AND SYSTEM FOR DATA SET MIGRATION OVER A CIRCUIT SWITCHING NETWORK

FIELD OF INVENTION

The embodiments of the invention are related to the field of networking. More specifically, the embodiments of the invention relate to a method and system for data set migration over a circuit switching network.

BACKGROUND

Cloud computing is changing the way that enterprises and consumers utilize applications and carry on their tasks. In cloud computing, data and applications are stored over the Internet instead of local storage, and instead of owning all the hardware and software where data and applications reside, an enterprise or a consumer (the "client" or "tenant") utilizes some or majority of the needed hardware and software owned by a cloud provider, which may utilize data centers (sometimes referred to as "datacenters") to store the data and run the applications. Data set migration is a common operation in a cloud computing environment, where the migration of a data set typically refers to relocating the state of a virtual machine, including its memory and storage. Data set migration may happen within a data center, and it may also happen between data centers, which are often geographically separated.

When data set migration occurs between data centers that are geographically separated, a communication network is typically deployed to connect the data centers. The communication network may include a wavelength switched optical network. A wavelength switched optical network offers a high line speed (e.g., 10G-40G bits/second) for data set migration, thus potentially may complete data set migration very quickly. Yet a wavelength switched optical network is a circuit switching network, which requires setting up prior to being utilized to transfer data. Unlike a packet switching network, where no setup time or minimum setup time (e.g., milliseconds) is required, a wavelength switched optical network generally takes much longer time (seconds, minutes, or even longer) to set up a wavelength path. Thus, the configuration of a wavelength switched optical network is relatively static.

In contrast, data set migration in a cloud computing environment can be on demand. End user behaviors, network conditions, server loads in the data centers, power saving policies and other factors may cause the need of data set migration changes dynamically, and it is a challenge to set up a circuit switched network such as a switched optical network efficiently to accommodate the dynamic needs of data set migration.

SUMMARY

A method for data set migration, implemented in a network device, is disclosed. The network device is coupled to a network connecting a first data center and a second data. The two data centers are geographically separated, and the network contains circuit switching devices transmitting data between the two data centers. The method includes receiving a request at the network device to migrate a data set from the first data center to the second data center, and sending a signaling packet from the first data center toward a first in a series of circuit switching devices to reach the second data center, where the signaling packet includes metadata containing transmission selection and characteristics of the data set to be migrated, where the signaling packet is processed through the series of circuit switching devices, each of which configures its forwarding path for the data set based at least on the metadata of the signaling packet. The method continues with waiting for a period of time, where the period of time is long enough to allow each of the series of circuit switching devices to configure its forwarding path for the data set, where the configuration at each circuit switching device is set to last for a migration duration during which the data set migration is performed at that circuit switching device, and where that circuit switching device releases the configured forwarding path for the data set migration after the migration duration. The method then continues with sending the data set to be migrated from the first data center toward the first in the series of circuit switching devices to reach the second data center following the transmission selection of the signaling packet after the period of time expires.

A method for data set migration, implemented in a circuit switching device, is disclosed. The circuit switching device is coupled to a network connecting a first data center and a second data center. The two data centers are geographically separated, and the network contains circuit switching devices transmitting data between the two data centers. The method includes receiving a signaling packet for migrating a data set, where the signaling packet includes metadata containing transmission selection and characteristics of the data set to be migrated. The method continues with configuring a forwarding path for the data set at the circuit switching device at least partially based on the metadata contained in the signaling packet. The method continues with forwarding the data set using the configured forwarding path upon receiving the data set after the configuration of the forwarding path, where the forwarding lasts for a migration duration, and where the migration duration is at least partially based on the metadata contained in the signaling packet. The method continues with releasing the configured forwarding path for the data set after the migration duration.

A network device for data set migration is disclosed. The network device is coupled to a network connecting a first data center and a second data center. The two data centers are geographically separated, and the network contains circuit switching devices transmitting data between the two data centers. The network device includes a processor and a non-transitory machine-readable storage medium coupled to the processor, the non-transitory machine-readable storage medium containing a data set migration module executable by the processor. The network device is operative to receive a request at the network device to migrate a data set from the first data center to the second data center, send a signaling packet from the first data center toward a first in a series of circuit switching devices to reach the second data center, where the signaling packet includes metadata containing transmission selection and characteristics of the data set to be migrated, where the signaling packet is processed through the series of circuit switching devices, each of which configures its forwarding path for the data set based at least on the metadata of the signaling packet. The network device is further operative to wait for a period of time, wherein the period of time is long enough to allow each of the series of circuit switching devices to configure its forwarding path for the data set, where the configuration at each circuit switching device is set to last for a migration duration during which the data set migration is performed at that circuit switching device, and where that circuit switching device releases the configured forwarding path for the data set migration after the migration duration. The network device is further operative to send the data set to be migrated from the first data center toward the first in the series of circuit switching devices to reach the second data center following the transmission selection of the signaling packet after the period of time expires.

A circuit switching device for data set migration is disclosed. The circuit switching device is coupled to a network connecting a first data center and a second data center. The two data centers are geographically separated, where the network contains circuit switching devices transmitting data between the two data centers. The circuit switching device comprises one or more input ports configured to receive a signaling packet for migrating a data set, where the signaling packet includes metadata containing transmission selection and characteristics of the data set to be migrated, one or more output ports configured to send the signaling packet after the signaling packet is processed, a switch fabric coupled to the input and output ports, and a switch control unit, coupled to the switch fabric and the input and output ports, configured to configure a forwarding path for the data set at least partially based on the metadata of the signaling packet. The switch control unit is further configured to cause the switch fabric to forward the data set using the configured forwarding path upon receiving the data set after the configuration of the forwarding path, where the forwarding is to last for a migration duration, and where the migration duration is at least partially based on the metadata contained in the signaling packet. The switch control unit is further configured to release the configured forwarding path for the data set after the migration duration.

A non-transitory machine-readable medium for data set migration is disclosed. The non-transitory machine-readable medium has instructions stored therein, which when executed by a processor, causes the processor to perform operations in an electronic device. The electronic device is coupled to a network connecting a first data center and a second data center, and where the two data centers are geographically separated, and where the network contains circuit switching devices transmitting data between the two data centers. The operations include receiving a request at the network device to migrate a data set from the first data center to the second data center, and sending a signaling packet from the first data center toward a first in a series of circuit switching devices to reach the second data center, where the signaling packet includes metadata containing transmission selection and characteristics of the data set to be migrated, where the signaling packet is processed through the series of circuit switching devices, each of which configuring its forwarding path for the data set based at least on the metadata of the signaling packet. The operations further include waiting for a period of time, wherein the period of time is long enough to allow each of the series of circuit switching devices to configure its forwarding path for the data set, where the configuration at each circuit switching device is set to last for a migration duration during which the data set migration is performed at that circuit switching device, and where that circuit switching device releases the configured forwarding path for the data set migration after the migration duration. The operations further include sending the data set to be migrated from the first data center toward the first in the series of circuit switching devices to reach the second data center following the transmission selection of the signaling packet after the period of time expires.

Another non-transitory machine-readable medium for data set migration is disclosed. The non-transitory machine-readable medium has instructions stored therein, which when executed by a processor, causes the processor to perform operations in a circuit switching device. The circuit switching device is coupled to a network connecting a first data center and a second data center. The two data centers are geographically separated, where the network contains circuit switching devices transmitting data between the two data centers. The operations include receiving a signaling packet for migrating a data set, where the signaling packet includes metadata containing transmission selection and characteristics of the data set to be migrated, configuring a forwarding path for the data set at the circuit switching device at least partially based on the metadata contained in the signaling packet, forwarding the data set using the configured forwarding path upon receiving the data set after the configuration of the forwarding path, wherein the forwarding lasts for a migration duration, and where the migration duration is at least partially based on the metadata contained in the signaling packet, and releasing the configured forwarding path for the data set after the migration duration.

Embodiments of the invention enable on-demand provisioning of a circuit switching network such as a switched optical network to accommodate the need of data set migration, and do not require a centralized architecture to manage the provisioning across networks spanning data centers and the circuit switching network.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this specification are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

Figure 1:
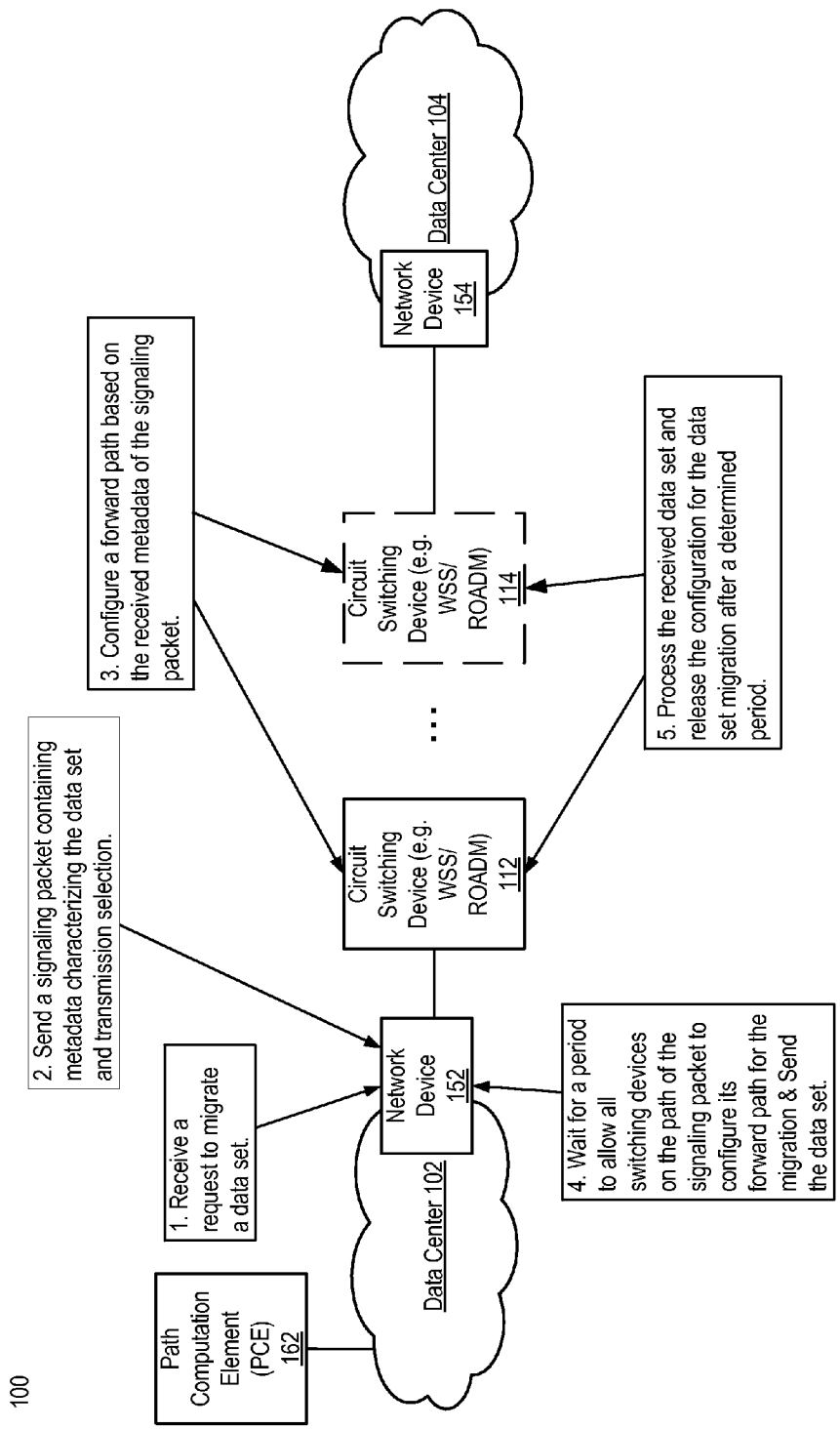
FIG. 1 illustrates operations between geographically separated data centers for data set migration according to one embodiment of the invention.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but not every embodiment may necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Data Set Migration and Existing Solutions

In a cloud computing environment, data center sites can be located far away from each other. Virtual machine (VM) migration transfers RAM and disk images from one data center to another and it is a typical example of data set migration between data centers. By moving VMs from heavily-loaded data centers to lightly-loaded data centers, live VM migration enables load balancing, improves resource utilization, and lowers energy consumption datacenter wide. VM migration also helps consolidate VMs from under-utilized data center locations to offer a better perspective of resource sharing and to achieve low resource fragmentation.

For small IT companies deploying their business on the hybrid cloud, live VM migration allows them to move or replicate their business services to the public cloud from the private cloud when the loads of service requests are peaking. For network providers, VMs can provide virtualized network functions that serve a group of end users, and VM migration can be triggered when user behavior or traffic pattern changes. Thus, VM migration is an important technique to manage cloud resources while achieving high resource utilization and load balancing.

VM migration typically requires a large amount of data (a data set) to be migrated from one location to another location. For example, one VM migration may come with 2 GB memory and 10 GB disk storage for hosting a web service application. If this VM is migrated live over a WAN with a maximum line rate of 100 Mb/s between datacenters in Seattle and San Jose, it can take 200 seconds for memory migration and 1000 seconds for disk storage migration. In addition, live VM migration can seriously impact the ongoing applications and service due to increased network load and throughput, and the source/destination of a communication being shifted. The response time of the Web service during the migration process can be significantly increased (e.g., 50 ms on average, as compared to 10 ms before the migration). In fact, live VM migration over the WAN is considered to be a major performance overhead of VMs in Infrastructure as a service (IaaS) clouds. Thus, in order to reduce dirty memory data generated during migration and to minimize the impact of migration on the ongoing services, live VM migration requires a short time to complete.

Existing packet-based forwarding solutions suffer from high processing and queuing delays at intermediate nodes when deployed between data centers for VM migration. For example, using TCP for live VM migration degrades the actual VM migration performance. In TCP the amount of data that can be sent before waiting for acknowledgment is governed by the TCP sliding window. The window closes aggressively when congestion is detected, and opens to its maximum quite slowly. TCP's congestion detection algorithm throws many false positives, meaning that the window often closes without justification. Thus the actual VM migration performance is much lower than the line speed at the intermediate nodes.

Given the shortcomings of the packet-based solutions, it is preferable to use a pre-established circuit in a circuit switched network with sufficiently high bandwidth to perform data set migration such as VM migration. However, unlike scheduled data set migration tasks (data replication, data synchronization), some data set migration in a cloud computing environment such as VM migration cannot be precisely predicted, depending on many factors such as network conditions and user behaviors. The dynamic nature of data set migration contrasts with typical static configuration of a circuit switching network. In addition, while a circuit can be pre-established between two data centers for future data set migration demand, the bandwidth will be wasted if there is no data set migration to be conducted. Thus it is challenging for a circuit switched network to offer on-demand connectivity for data set migration in the cloud computing environment.

Data Set Migration Between Geographically Separated Data Centers (DCs)

FIG. 1 illustrates operations between geographically separated data centers for data set migration according to one embodiment of the invention. Data centers 102 and 104 are geographically separated (e.g., miles to hundreds of miles apart). Through network devices 152 and 154 coupled to data centers 102 and 104 respectively, the two data centers may migrate data sets between each other. Network devices 152 and 154 are coupled to a number of circuit switching devices 112 and 114; each may be a wavelength selective switch (WSS) or reconfigurable optical add-drop multiplexer (ROADM). The network devices and the circuit switching devices are electronic devices discussed herein above. Note while only wavelength switching devices are illustrated, time-division switching devices may also be implemented between the data centers for data set migration.

The circuit switching devices 112 and 114 offer guaranteed bandwidth and low latency. When the circuit switching devices are wavelength switching devices, an optical path (also referred to as a light path) is established between the two data centers. The optical path may take multiple concatenated fiber links and occupy the same wavelength on each link. The wavelength switching devices may be configured for wavelength domain connectivity between their respective input and output ports on the optical path. Data set migration traffic carried on wavelengths may be switched all optically through the wavelength switching devices without processing by any upper electronic layer thus reducing transit delay.

Path computation element (PCE) 162 is the entity that has global information of the path between data centers 102 and 104. The global information includes link connectivity, wavelength usage (for a wavelength switched network), and/or timeslot usage (for a time slot switched network). PCE 162 is responsible for preforming routing and resource (wavelength or time slot) assignment upon receiving a data set migration request in one embodiment. PCE 162 may be a standalone network device, but it may also be a hardware/software module of another network device such as network device 152.

Referring to FIG. 1, task boxes 1 to 5 illustrate the order in which data set migration is performed according to one embodiment of the invention. At task box 1, network device 152 receives a request to migrate a data set from data center 102 to data center 104. A data set is a collection of data stored within a storage space in a variety of formats in data center 102. The data set is a VM image containing RAM and/or disk images in one embodiment. The request may contain various information such as the size of the data set, the source and destination addresses of the data set, and the deadline to complete the migration of the data set. The request may be sent to PCE 162 first when PCE 162 is not embedded within network device 152, in which case PCE 162 relays the request to network device 152, which is the one interacting with a circuit switched network between data centers 102 and 104 to migrate the data set.

At task box 2, network device 152 processes the request, and it sends out a signaling packet including metadata containing transmission selection and characteristics of the data set to be migrated. The transmission selection may be based on the request and also the information of the path between data centers 102 and 104. The characteristics of the data set may be derived from the request to migrate the data set. The signaling packet is sent to the first in a series of circuit switching devices to reach data center 104.

At task box 3, each circuit switching device configures a forwarding path based on the metadata contained in the received signaling packet. The circuit switching device forwards the received signaling packet to the next circuit switching device after the reception. The signaling packet may eventually reach data center 104 through network device 154. In one embodiment, network device 154 sends an acknowledgement back to network device 154 to confirm that the signaling packet has been processed through the series of circuit switching devices. In this embodiment, the acknowledgement closes the loop of the signaling, and network device 152 then may start sending the data set and starting the data set migration. In an alternate embodiment, no acknowledgement is sent back, the "open loop" approach counts on each circuit switching device in the series to configure its forward path without confirmation.

At task box 4, network device 152 waits for a period of time to allow each of the series of circuit switching devices to configure its forward path for the data set migration (open-loop signaling), or until it receives an acknowledgement from network device 154 (closed-loop signaling); after the period, network device 152 sends the data set to the first of the series following the transmission selection of the signaling packet.

At task box 5, each circuit switching device forwards the received data set using the configured forwarding path. The forwarding of the received data set lasts for a migration duration, where the migration duration is at least partially based on the metadata contained in the signaling packet. The migration duration is the time period determined by the circuit switching as necessary for transmitting the data set at the circuit switching device, including a margin for unpredictable delays in setup and transfer of the data set. After the migration duration, the forwarding path is released and the resource consumed by the forwarding path may be utilized by other tasks to forward traffic.

Note through this approach, a signaling packet is sent prior to migrating the data set. The signaling packet is sent through the circuit switched network to sequentially configure each circuit switching device so that each circuit switching device offers its forwarding path for the duration of the data set being forwarded through the circuit switching device. That is, each circuit switching device in the series presents a configured circuit when the data set arrives. Each circuit switching device releases the configured circuit once the data set is forwarded through the circuit switching device. This approach thus combines the benefits of high bandwidth of the circuit switching devices and agility of packet-switching-like on-demand forwarding path configuration and release, and it is suitable for dynamic data set migration in the cloud computing environment, among many applications.

Signaling for Data Set Migration

Figure 2:
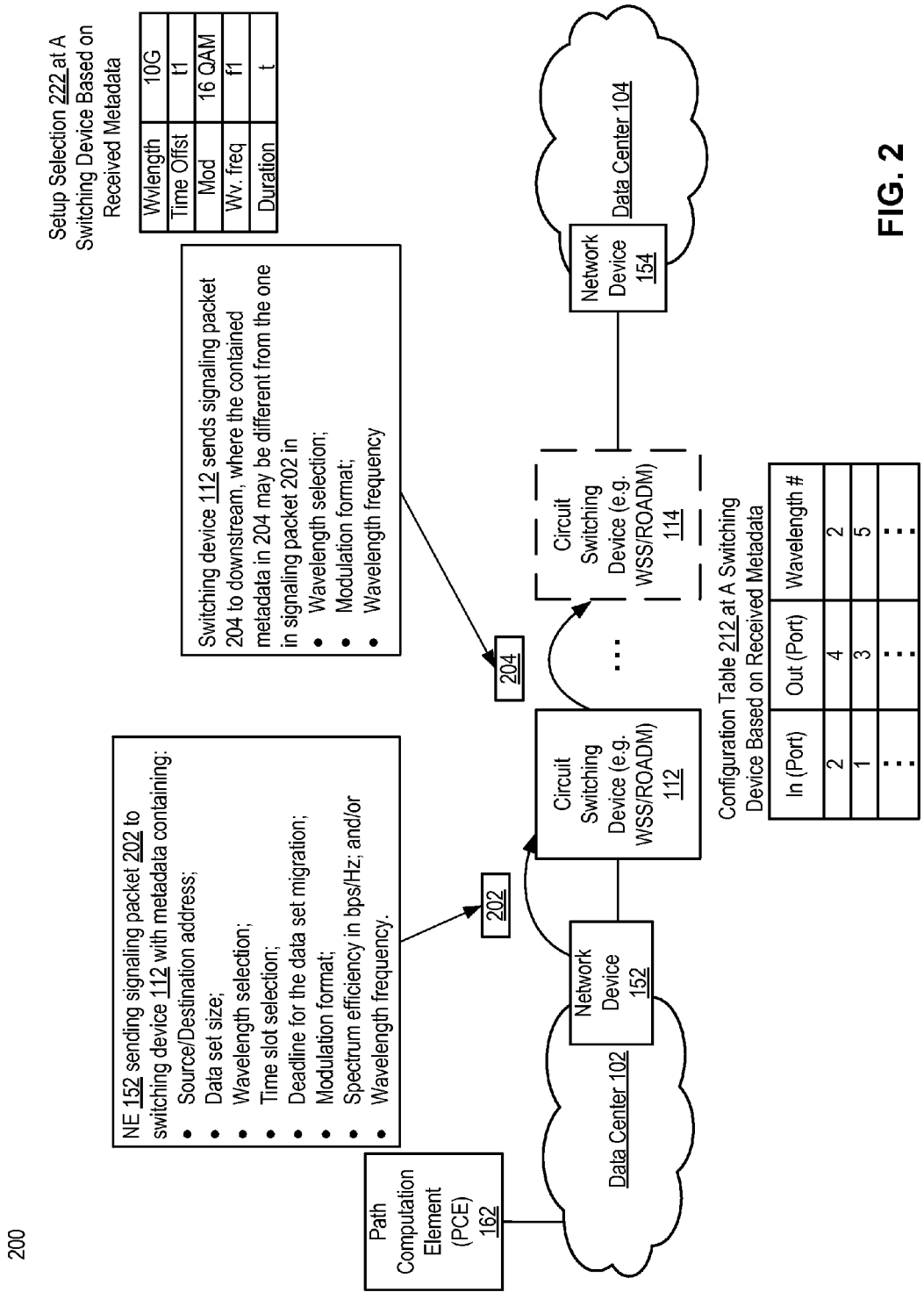
FIG. 2 illustrates signaling at various network devices and circuit switching device according to one embodiment of the invention.

FIG. 2 illustrates signaling at various network devices and circuit switching devices according to one embodiment of the invention. System 200 is similar to system 100, and the same or similar references indicate elements or components having the same or similar functionalities. As the data set migration follows the transmission selection of the signaling packets, the focus here is on the signaling packets.

Signaling packet 202 is sent from network device 152 to the first of a series of circuit switching devices, circuit switching device 112. Signaling packet 202 includes metadata that contains at least two types of information. One type is information to characterize the data set to be migrated. The other type is information on the transmission selection for the data set migration.

The characteristics of the data set includes one or more of:
Source address of the data set
Destination address of the data set
Data set size
Deadline for completion of the data set migration
Expected starting time for the data set migration
Service level agreement (SLA) for the data set migration The transmission selection for the data set migration includes one or more of:
Wavelength speed selection (e.g., 10G or 40G bps for wavelength switching network device)
Time slot selection (for time slot switching network device)
Wavelength frequency (e.g., $\lambda_n$ from a choice of $\lambda_1 \ldots \lambda_N$)
Spectrum efficiency in bps/Hertz in transmitting the data set
Modulation format for the data set (quadrature amplitude modulation QAM, phase-shift keying PSK, etc)

Signaling packet 202 is sent through the link or links coupled between network device 152 and circuit switching device 112, and it may be transmitted through an already allocated wavelength or an allocated time slot of the link, for example through an auxiliary channel defined in standards.

Circuit switching device 112 sets up a forwarding path at the circuit switching device based on the metadata. Note the circuit switching devices here are capable of processing the signaling packet, in addition to their capability to transmit the data set in the forwarding path. For example, when a circuit switching device is a wavelength switching device, it converts the signaling packet through an optical/electrical conversion, and then utilizes embedded metadata for configuring the forwarding path.

The forwarding path configuration includes setting up or updating a configuration table such as configuration table 212, where the input ports, output ports, and wavelength selection are stored. The forwarding path configuration also includes setup selection at reference 222, where the wavelength, time offset, modulation, wavelength frequency, and migration duration are selected. The selection is at least partially based on the received metadata. For example, based on the size of the data set to be migrated (say 10 GB) and the deadline, circuit switching device 112 may calculate a suitable wavelength so that the data set may be migrated prior to the specified deadline: 10 GB (data set size)/1 Gbps (line speed offered by a wavelength)=80 seconds for forwarding the data set through circuit switching device 112, and it may not be fast enough per specified baseline; another wavelength, say corresponding to 10 G bps may be needed for the data set migration. In this example, the migration duration is determined based on the calculation, and it is 80 seconds for 1 G bps line speed or 8 seconds for 10 G bps line speed. Circuit switching device 112 may be provisioned to keep the configured forwarding path only for the migration duration, after which the configured forwarding path is released.

The configuration of the forwarding path also may depend on resource availability at the switching device. For example, when no available wavelength can be found for the desired output port to the next hop (a circuit switching device or another network device), the circuit switching device may send the data set to be migrated through wavelength conversion. Or, when the cumulative impairments are sufficiently severe, the circuit switching device may configure the forwarding path to regenerate the optical signal at the circuit switching device. The forwarding path may include optical/electrical/optical (O/E/O) conversion at the circuit switching device for the data set.

Circuit switching device 112 sends signaling packet 204 to the next circuit switching device 114 downstream in the series of circuit switching devices toward data center 104. Signaling packet 204 may be modified with different metadata as contained in signaling packet 202. The metadata in signaling packet 204 may indicate a different wavelength selection, modulation format, wavelength frequency or other parameters. The change of the metadata in the signaling packets may be due to resource constraints where the initial selection (e.g., the wavelength selection) can't be configured for all the circuit switching devices and the one can't accommodate the selection needs to configure its forwarding path with a different selection and thus impact the selection of the next hop.

At circuit switching device 114, similarly the forwarding path is configured based on the metadata in the signaling packet 204. Circuit switching device 114 sends the same or updated signaling packet to the next hop until all the circuit switching devices in the series are configured with their respective forwarding paths.

In this approach, a circuit switching device configures its own forwarding path. The system does not require a centralized architecture, and based on its resource availability and the request of the signaling packet, each circuit switching device determines the configuration of its forwarding path. The decentralized approach is particularly suitable for data set migration between geographically separated data centers, where centralized configuration may be costly and inflexible to implement.

Limited Duration of Forwarding Path

One feature of the embodiments of the invention is that a circuit switching device configures its forwarding path for a data set to be migrated only for a limited period, after which the forwarding path is released. That is, unlike a circuit switching device in a traditional circuit switched network, the circuit switching device dynamically configures and releases its forwarding path based on the signaling packet in embodiments of the invention.

Figure 3:
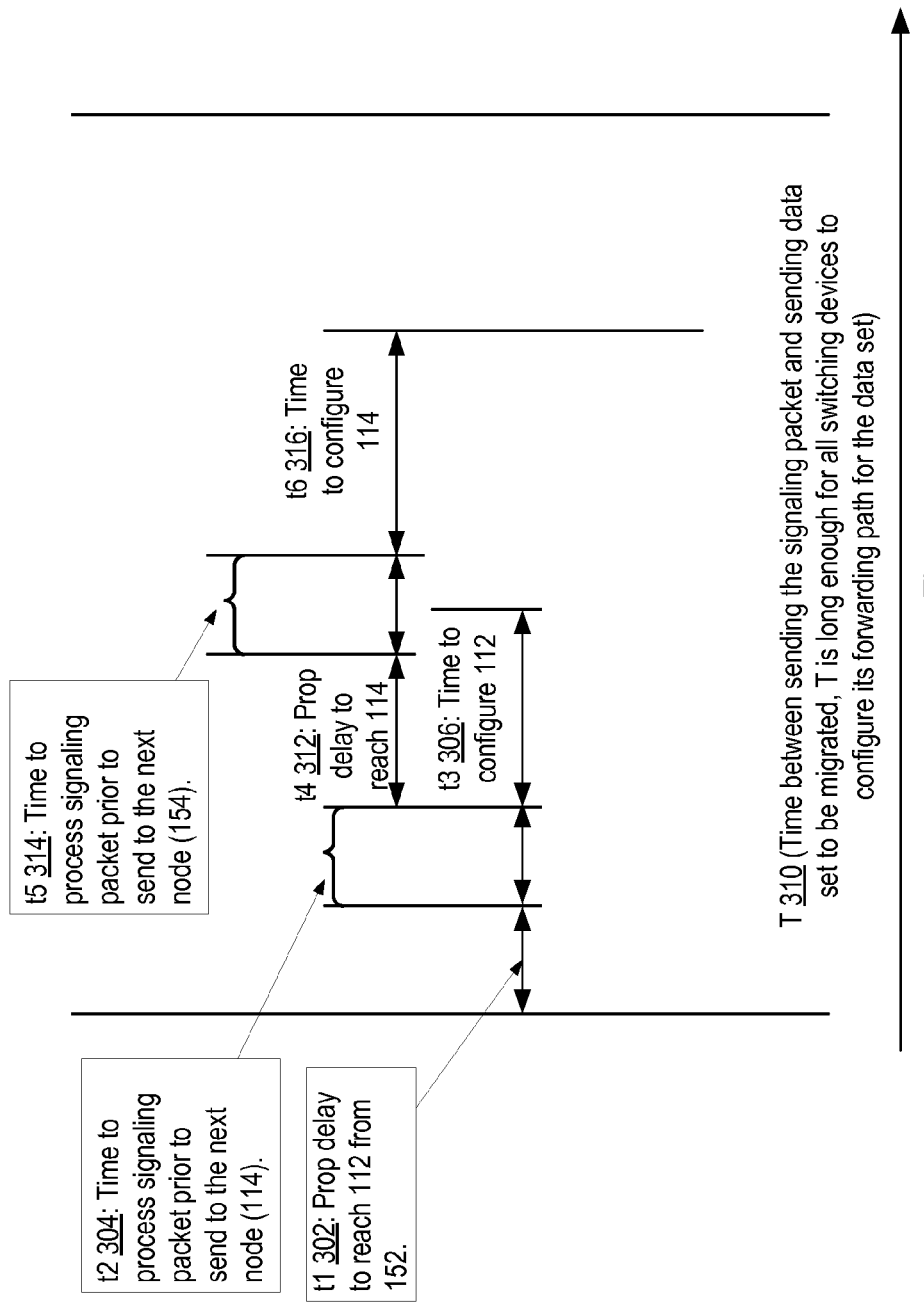
FIG. 3 is a block diagram illustrating various time periods relating to data set migration according to one embodiment of the invention.

The limited duration of the forwarding path is determined based on the need of data set migration. FIG. 3 is a block diagram illustrating various time periods relating to data set migration according to one embodiment of the invention. The time line includes the time periods for the signaling packet to go from network device 152, through circuit switching devices 112 and 114.

At reference 302, t1 is the propagation delay from network device 152 to circuit switching device 112. At reference 304, t2 is the time period for circuit switching device 112 to process the signaling packet prior to sending to the next circuit switching device 114. The processing is for circuit switching device 112 to determine and evaluate the metadata in the signaling packet. At reference 306, t3 is the time period for circuit switching device 112 to configure its forwarding path in preparation of the data set following the signaling packet. Note time period t2+t3 is the whole duration that network device 152 needs to wait for circuit switching device 112 to finish its configuration of forwarding path. Network device 152 does not need to wait for the additional propagation delay t1 to send out the data set to be migrated to circuit switching device 112.

Similarly, for circuit switching device 114, it takes propagation delay (t4, 312), time to process the signaling packet (t5, 314), and time to configure its forwarding path (t6, 316) to set up its forwarding path. The time period t5+t6 is the duration that network device 152 needs to wait for circuit switching device 114 to finish its configuration of forwarding path. Note there is some overlap between t3 and t4 in this example, where the signaling packet is sent from circuit switching devices 112 to 114 without waiting for the former to finish its configuration of forwarding path.

For network device 152, it needs to wait all the circuit switching devices in the series of circuit switching devices between network devices 152 and 154 to finish their configuration of forwarding paths, and T (310) denotes such time period, which is shown to include a certain safety margin. The time period may be referred to as an offset time, which is the minimum time needed between sending the signaling packet and sending the data set to be migrated.

For each circuit switching device, it may configure its forwarding path right after it receives the signaling path as illustrated, so that the forwarding path may be configured until the data set is transmitted through the circuit switching device. In an alternative embodiment, a circuit switching device may delay its configuration of its forwarding path so that the forwarding path becomes effective only when the data set is about to arrive at the circuit switching device. Thus, the circuit switching device may have an offset time too, which is different from the offset time of network device 152. Potentially each circuit switching device may have its own individually calculated offset time to set up the forwarding path, and a circuit switching device only configures its forwarding path after its offset time.

In an embodiment, the network device 154 at the far end of the circuit switched network may be configured to return an acknowledgement packet to the originating end 152 when the path has been set up. This may avoid the need to predict propagation and setup delays along the series of circuit switching devices.

In an embodiment, the signaling packets may pass through the series of circuit switching devices, but rather than immediately setting up forwarding paths, the circuit switching devices may respond to start time or completion deadline metadata to schedule forwarding path setup for some time in the future, the time calculated by the circuit switching devices to satisfy the demands of the metadata.

Flow Diagram for Network Device to Migrate Data Set

Figure 4:
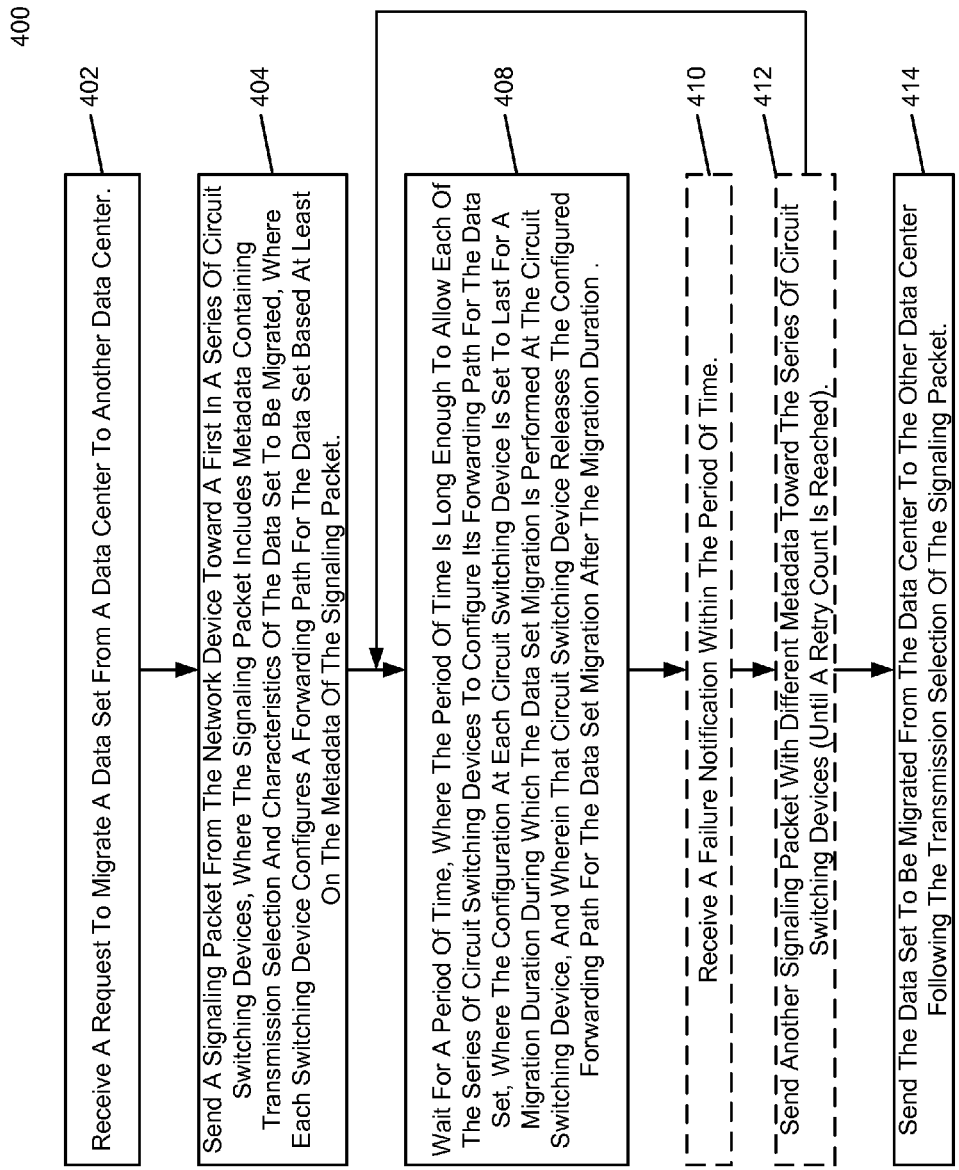
FIG. 4 is a flow diagram illustrating a method for a network device to migrate a data set according to one embodiment of the invention.

FIG. 4 is a flow diagram illustrating a method for a network device to migrate a data set according to one embodiment of the invention. Method 400 may be implemented in a network device such as network device 152 in FIG. 1.

At reference 402, the network device receives a request to migrate a data set from a first data center (source data center) to a second data center (destination data center). The data set may be a VM image in one embodiment. The network device is coupled to the source data center and the received request may include the data set characteristics such as source address, destination address, data set size, deadline for the data set migration, expected starting time, and SLA for the data set migration.

At reference 404, the network device sends a signaling packet from the source data center toward a first in a series of circuit switching devices to reach the destination data center. The signaling packet includes metadata containing transmission selection and characteristics of the data set to be migrated. The first circuit switching device configures a forwarding path for the data set at least based on the metadata of the signaling packet. The first circuit switching device sends the signaling packet to the next circuit switching device, which in turn does the same until the signaling packet is processed by all the circuit switching devices of the series.

The metadata in the signaling packet contains transmission selection and characteristics of the data set to be migrated. The transmission selection of the data set to be migrated may include one or more of wavelength selection (when the circuit switching devices are wavelength switching devices), time slot selection (when the circuit switching devices are timeslot switching devices), wavelength frequency (for wavelength switching device), spectrum efficiency in bps/Herz, modulation format for the data set. The characteristics of the data set to be migrated includes one or more of source address, destination address, data set size, deadline for the data set migration, expected starting time, and SLA for the data set migration.

At reference 408, the network device waits for a period of time, where the period of time is long enough to allow each of the series of circuit switching devices to configure its forwarding path for the data set. The configuration at each circuit switching device is set to last only for a migration duration during which the data set migration is performed at the circuit switching device, plus some margin for safety. The circuit switching device releases the configured forwarding path for the data set migration after the migration duration.

Optionally at reference 410, the network device receives a failure notification within the period of time. The failure notification may be sent back by the destination data center or a circuit switching device in the series. The failure notification may indicate that a particular circuit switching device cannot configure its forwarding path for the data set. Or the failure notification may indicate that the destination data center is not in a state ready for receiving the data set.

The network device then may send another signaling packet with a different metadata toward the series of circuit switching device. The metadata may contain different transmission selection from the earlier signaling packet for the network device to try a different transmission option, and the series of circuit switching device may be different too. In addition, the characteristics of the data set may be updated based on the status of the data set at the moment—the deadline for the migration may change, the size of the data set may be updated given the dynamic nature of data set (e.g., for a live VM migration, the VM image size may change between the retry of the signaling packets). The updated signaling packet will go through operations in references 408 and 412 until no failure notification is received or a retry count is reached. If the retry count is reached and the network device still receives a failure notification, the network device may declare data set migration failure. Otherwise the flow goes to reference 412.

At reference 412, after the period of time expires, the network device sends the data set to be migrated from the first data center toward the first in the series of circuit switching devices to reach the second data center following the transmission selection of the signaling packet.

Operations and Architecture of a Circuit Switching Device

Figure 5:
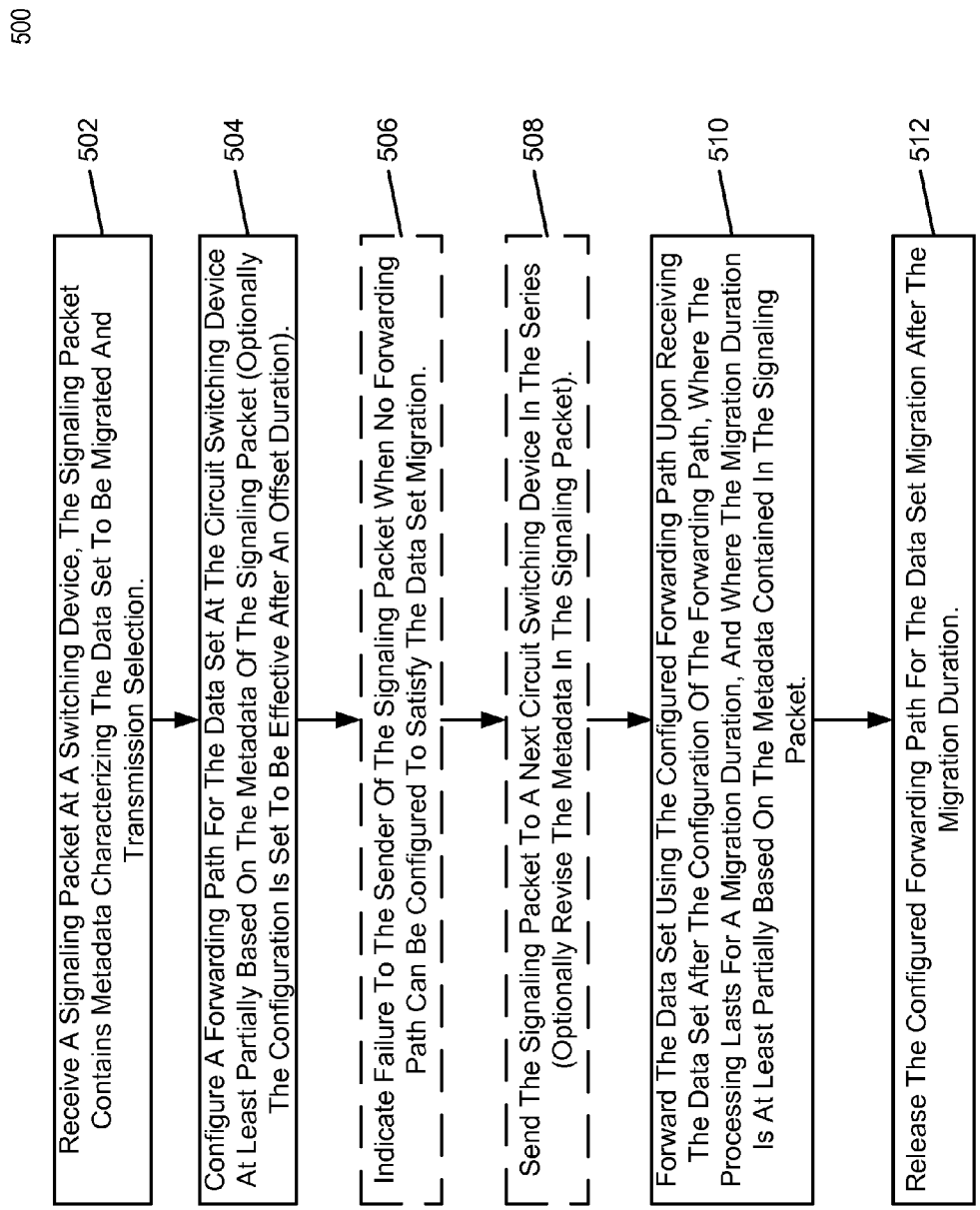
FIG. 5 is a flow diagram illustrating a method for a circuit switching device to migrate a data set according to one embodiment of the invention.

FIG. 5 is a flow diagram illustrating a method for a circuit switching device to migrate a data set according to one embodiment of the invention. Method 500 may be performed in a circuit switching device such as circuit switching devices 112 or 114. The circuit switching device may be a wavelength switching device 600 of FIG. 6, or it may also be a time slot switching device.

At reference 502, the circuit switching device receives a signaling packet for migrating a data set at an input port of the circuit switching device. The signaling packet includes metadata containing transmission selection and characteristics of the data set to be migrated. The transmission selection and characteristics of the data set to be migrated are the ones discussed herein above.

At reference 504, the circuit switching device configures a forwarding path for the data set at the circuit switching device at least partially based on the metadata contained in the signaling packet. The configuration may be coordinated by a switch control unit. The configuration of the forwarding path may be also based on the resource availability of the circuit switching device.

In one embodiment, the circuit switching device does not configure the forwarding path right away, instead it waits an offset time based on the metadata contained in the signaling packet. For example, based on the size of the data set and the deadline of the migration, the circuit switching device may time the configuration of the forwarding path so that the completion of the forwarding path is right before the data set arrives at the circuit switching device. In an alternative embodiment, the circuit switching device causes the forwarding path to be effective after the offset time.

In one embodiment, the circuit switching device indicates a failure to the sender of the signaling packet when no forwarding path can be configured to satisfy the need of data set migration at reference 506. The sender of the signaling packet may be another circuit switching device upstream of the series or the sending network device of the data set. The failure indication may be used by the sending network device to send another signaling packet with different transmission selection and characteristics of the data set, from which the circuit switching device may determine if a forwarding path can be configured.

In one embodiment, the circuit switching device sends the signaling packet to a next circuit switching device in the series at reference 508. In one embodiment, the circuit switching device revises the metadata in the received signaling packet prior to forwarding it on to the next circuit switching device.

Then at reference 510, the circuit switching device forwards the data set using the configured forwarding path upon receiving the data set after the configuration of the forwarding path. The forwarding lasts for a migration duration, wherein the migration duration is at least partially based on the metadata contained in the signaling packet.

At reference 512, the circuit switching device releases the configured forwarding path for the data set after the migration duration.

Figure 6:
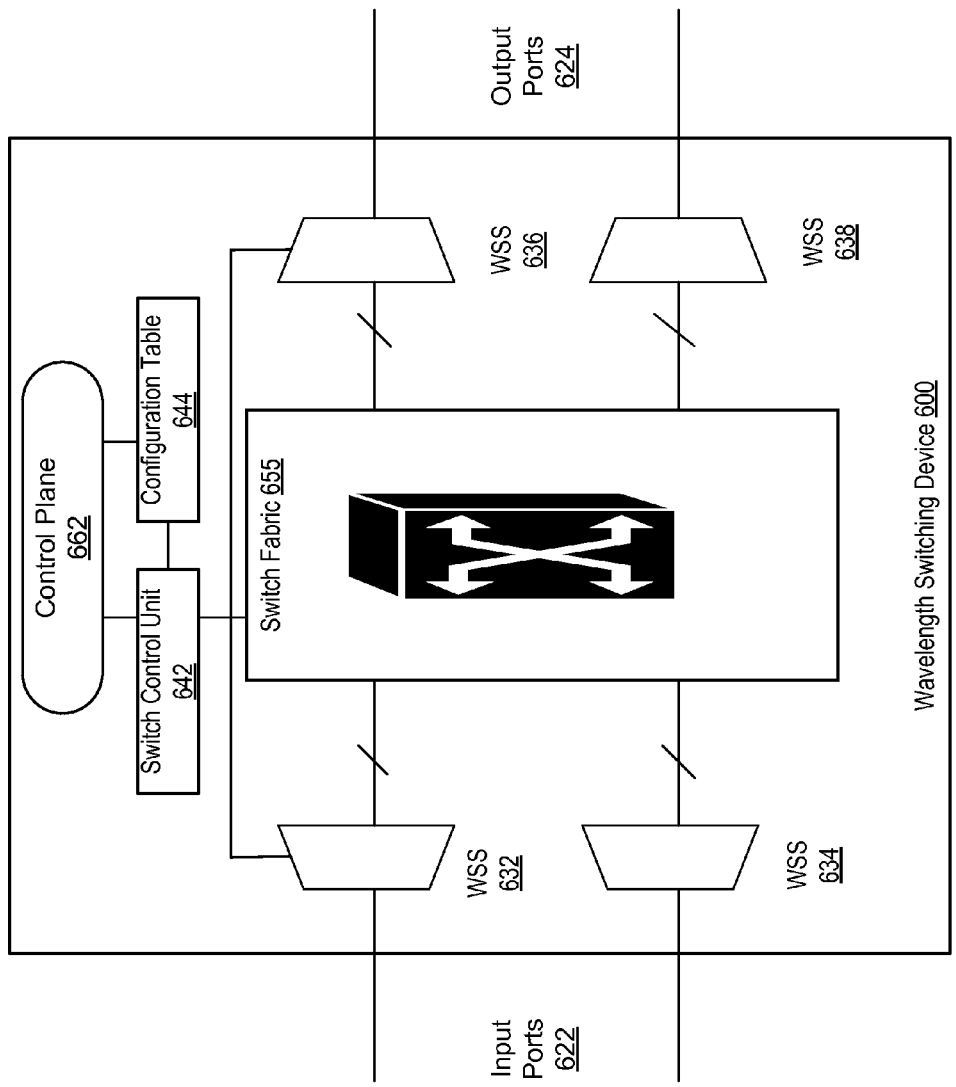
FIG. 6 illustrates a wavelength switching device performing the method of configuring its forwarding path according to one embodiment of the invention.

FIG. 6 illustrates a wavelength switching device performing the method of configuring its forwarding path according to one embodiment of the invention. Wavelength switching device 600 is a type of circuit switching device, and it is circuit switching device 112 or 114 of FIG. 1 in one embodiment.

Wavelength switching device 600 contains input ports 622 and output ports 624. The signaling packets and data sets to be migrated are received at input ports 622 and forwarded to output ports 624. Wavelength switching device 600 contains wavelength selective switches (WSSes) 632, 634, 636, and 638. Wavelength switching device 600 also contains switch fabric 655 to switch data sets among the WSSes in configuring its forwarding path for a data set. The WSSes and switch fabric are coupled to switch control unit 642, which is also coupled to configuration table 644 and control plane 662.

Switch control unit 642 takes requests from control plane 662 for configuring its forwarding path, with reference to configuration table 644 (similar to configuration table 212 of FIG. 2). Switching control unit 642 coordinates the configuration of the forwarding path through interactions and performs method 500 as described herein above.

Architecture of a Network Device

Figure 7:
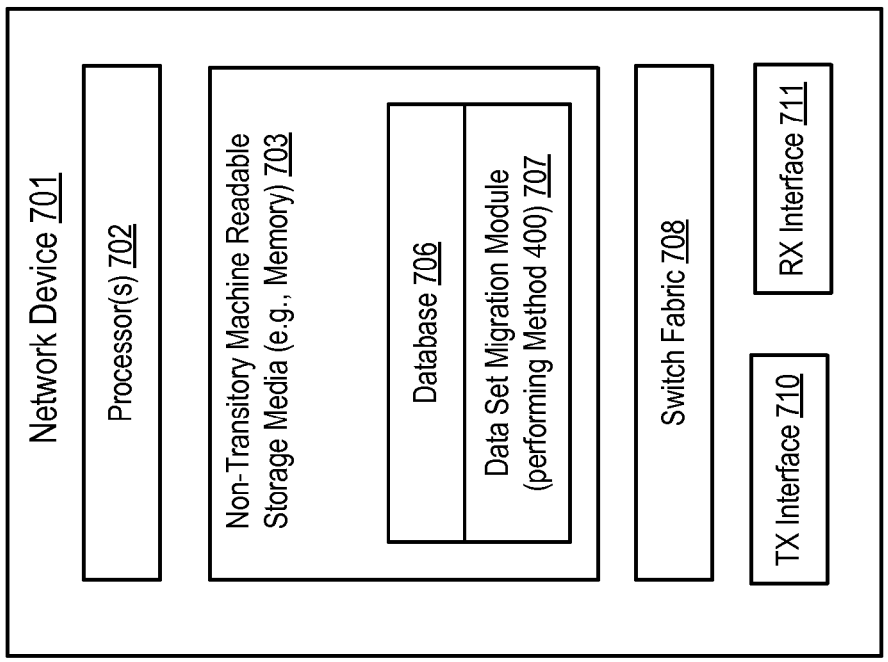
FIG. 7 illustrates a network device containing a data set migration module according to one embodiment of the invention.

FIG. 7 illustrates a network device containing a data set migration module according to one embodiment of the invention. Network device 701 may be network device 152 of FIG. 1 in one embodiment. Network device 701 contains processor or processors 702. It also contains non-transitory machine readable storage media 703, which contains database 706 that may store path information (e.g., data stored in a path computation element (PCE)). Data set migration module 707 may perform method 400 as discussed herein above.

Network device 701 may also contain switch fabric 708 to switch data between transmitting/receiving interfaces 710/711 and processor 702 in performing data set migration. Note the switch fabric may contain paths for transmitting both electrical and optical signals for sending signaling packets and data sets.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented in a network device coupled to a network connecting a first data center and a second data center, wherein the two data centers are geographically separated, wherein the network contains circuit switching devices transmitting data between the two data centers, the method comprising:
   receiving a request at the network device to migrate a data set from the first data center to the second data center;
   sending a signaling packet from the first data center toward a first in a series of circuit switching devices to reach the second data center, wherein the signaling packet includes metadata containing transmission selection and characteristics of the data set to be migrated, wherein the signaling packet is processed through the series of circuit switching devices, each of which configures its forwarding path for the data set based at least on the metadata of the signaling packet;

waiting for a period of time, wherein the period of time is long enough to allow each of the series of circuit switching devices to configure its forwarding path for the data set, wherein the configuration at each circuit switching device is set to last for a migration duration during which the data set migration is performed at that circuit switching device, and wherein that circuit switching device releases the configured forwarding path for the data set migration after the migration duration; and sending the data set to be migrated from the first data center toward the first in the series of circuit switching devices to reach the second data center following the transmission selection of the signaling packet after the period of time expires.

2. The method of claim 1, wherein the metadata includes an indication of a size of the data set and at least one of circuit information including wavelength selection, time slot selection, a scheduled start time for the data set migration, and a deadline for the data set migration.

3. The method of claim 1, wherein the data set to be migrated are data of a virtual machine (VM), and wherein the data set migration moves the VM from the first data center to the second data center.

4. A method implemented in a circuit switching device coupled to a network connecting a first data center and a second data center, wherein the two data centers are geographically separated, wherein the network contains a series of circuit switching devices including the circuit switching device for transmitting data between the two data centers, the method comprising:

receiving a signaling packet for migrating a data set, wherein the signaling packet includes metadata containing transmission selection and characteristics of the data set to be migrated;

configuring a forwarding path for the data set at the circuit switching device at least partially based on the metadata contained in the signaling packet;

forwarding the data set using the configured forwarding path upon receiving the data set after the configuration of the forwarding path, wherein the forwarding lasts for a migration duration, and wherein the migration duration is at least partially based on the metadata contained in the signaling packet; and releasing the configured forwarding path for the data set after the migration duration.

5. The method of claim 4, further comprising:

sending the signaling packet to a next circuit switching device in the series.

6. The method of claim 5, further comprising:

revising the metadata in the received signaling packet prior to forwarding it on to the next circuit switching device.

7. The method of claim 4, wherein the circuit switching device is a wavelength switching device.

8. The method of claim 4, wherein the configuring the forwarding path comprises configuring the forwarding path to be effective after an offset duration.

9. A network device coupled to a network connecting a first data center and a second data center, wherein the two data centers are geographically separated, wherein the network contains circuit switching devices transmitting data between the two data centers, the network device comprising:

a processor and a non-transitory machine-readable storage medium coupled to the processor, the non-transitory machine-readable storage medium containing a data set migration module executable by the processor, wherein the network device is operative to:

receive a request at the network device to migrate a data set from the first data center to the second data center, send a signaling packet from the first data center toward a first in a series of circuit switching devices to reach the second data center, wherein the signaling packet includes metadata containing transmission selection and characteristics of the data set to be migrated, wherein the signaling packet is processed through the series of circuit switching devices, each of which configures its forwarding path for the data set based at least on the metadata of the signaling packet, wait for a period of time, wherein the period of time is long enough to allow each of the series of circuit switching devices to configure its forwarding path for the data set, wherein the configuration at each circuit switching device is set to last for a migration duration during which the data set migration is performed at that circuit switching device, and wherein that circuit switching device releases the configured forwarding path for the data set migration after the migration duration, and send the data set to be migrated from the first data center toward the first in the series of circuit switching devices to reach the second data center following the transmission selection of the signaling packet after the period of time expires.

10. The network device of claim 9, wherein the metadata is to include an indication of a size of the data set and at least one of circuit information including wavelength selection, time slot selection, a scheduled start time for the data set migration, and a deadline for the data set migration.

11. The network device of claim 9, wherein the data set to be migrated is data of a virtual machine (VM), and wherein the data set migration moves the VM from the first data center to the second data center.

12. A circuit switching device coupled to a network connecting a first data center and a second data center, wherein the two data centers are geographically separated, wherein the network contains a series of circuit switching devices transmitting data between the two data centers, and wherein the circuit switching device is one of the series of circuit switching devices, the circuit switching device comprising:

one or more input ports configured to receive a signaling packet for migrating a data set, wherein the signaling packet includes metadata containing transmission selection and characteristics of the data set to be migrated;

one or more output ports configured to send the signaling packet after the signaling packet is processed;

a processor and a non-transitory machine-readable storage medium coupled to the processor, the non-transitory machine-readable storage medium containing instructions executable by the processor, wherein the processor is configured to operate on the signaling packet and wherein the instructions, which when executed by the processor, cause the circuit switching device to perform operations to:

configure a forwarding path for the data set at least partially based on the metadata of the signaling packet, forward the data set using the configured forwarding path upon receiving the data set after the forwarding path is configured, wherein the forwarding path is to last for a migration duration, and wherein the migration duration is at least partially based on the metadata contained in the signaling packet, and release the configured forwarding path for the data set after the migration duration.

13. The circuit switching device of claim 12, wherein the metadata in the received signaling packet is to be revised prior to forwarding it on to a next circuit switching device of the series of circuit switching devices.

14. The circuit switching device of claim 12, wherein the circuit switching device is a wavelength switching device.

15. The circuit switching device of claim 14, wherein the wavelength switching device is one of a reconfigurable optical add-drop multiplexer (ROADM) or a wavelength selective switch (WSS).

16. The circuit switching device of claim 12, wherein the forwarding path is set to be effective after an offset duration.

17. A non-transitory machine-readable medium having instructions stored therein, which when executed by a processor, cause the processor to perform operations in an electronic device coupled to a network connecting a first data center and a second data center, wherein the two data centers are geographically separated, and wherein the network contains circuit switching devices transmitting data between the two data centers, the operations comprising:

receiving a request at a network device to migrate a data set from the first data center to the second data center;

sending a signaling packet from the first data center toward a first in a series of circuit switching devices to reach the second data center, wherein the signaling packet includes metadata containing transmission selection and characteristics of the data set to be migrated, wherein the signaling packet is processed through the series of circuit switching devices, each of which configures its forwarding path for the data set based at least on the metadata of the signaling packet;

waiting for a period of time, wherein the period of time is long enough to allow each of the series of circuit switching devices to configure its forwarding path for the data set, wherein the configuration at each circuit switching device is set to last for a migration duration during which the data set migration is performed at that circuit switching device, and wherein that circuit switching device releases the configured forwarding path for the data set migration after the migration duration; and sending the data set to be migrated from the first data center toward the first in the series of circuit switching devices to reach the second data center following the transmission selection of the signaling packet after the period of time expires.

18. The non-transitory machine-readable medium of claim 17, wherein the metadata includes an indication of a size of the data set and at least one of circuit information including wavelength selection, time slot selection, a scheduled start time for the data set migration, and a deadline for the data set migration.

19. The non-transitory machine-readable medium of claim 17, wherein the data set to be migrated are data of a virtual machine (VM), and wherein the data set migration moves the VM from the first data center to the second data center.

20. A non-transitory machine-readable medium having instructions stored therein, which when executed by a processor, cause the processor to perform operations in a circuit switching device coupled to a network connecting a first data center and a second data center, wherein the two data centers are geographically separated, and wherein the network contains circuit switching devices transmitting data between the two data centers, the operations comprising:

receiving a signaling packet for migrating a data set, wherein the signaling packet includes metadata containing transmission selection and characteristics of the data set to be migrated;

configuring a forwarding path for the data set at the circuit switching device at least partially based on the metadata contained in the signaling packet;

forwarding the data set using the configured forwarding path upon receiving the data set after the configuration of the forwarding path, wherein the forwarding lasts for a migration duration, and wherein the migration duration is at least partially based on the metadata contained in the signaling packet; and releasing the configured forwarding path for the data set after the migration duration.

21. The non-transitory machine-readable medium of claim 20, wherein the operations further comprise:

sending the signaling packet to a next circuit switching device in a series of circuit switching devices.

22. The non-transitory machine-readable medium of claim 21, wherein the operations further comprise:

revising the metadata in the received signaling packet prior to forwarding it on to the next circuit switching device.

23. The non-transitory machine-readable medium of claim 20, wherein the circuit switching device is a wavelength switching device.

24. The non-transitory machine-readable medium of claim 20, wherein the configuration of the forwarding path is set to be effective after an offset duration.

* * * * *